United States Patent [19]

Kotzin

[11] Patent Number: 4,689,848
[45] Date of Patent: Sep. 1, 1987

[54] CASTER HAVING INTERFITTING HOUSING MEMBERS WITH INTEGRAL BEARINGS AND A SEPARATE AXLE

[76] Inventor: Bernard Kotzin, 510 Anderson St., Manhattan Beach, Calif. 90266

[21] Appl. No.: 877,533

[22] Filed: Jun. 23, 1986

[51] Int. Cl.⁴ .............................................. B60B 33/00
[52] U.S. Cl. ........................................ 16/46; 16/31 R
[58] Field of Search .............. 16/18 CG, 31 R, 31 A, 16/37, 38, 39, 45, 46, 47, 48

[56] References Cited

U.S. PATENT DOCUMENTS

| | | | |
|---|---|---|---|
| 1,432,966 | 10/1922 | Chesnutt | 16/45 |
| 1,836,246 | 12/1931 | Herold | 16/37 |
| 2,184,038 | 12/1939 | Dayton | 16/31 R X |
| 2,461,652 | 2/1949 | Montgomery, Sr. | 16/37 X |
| 3,470,577 | 10/1969 | Kotzin, Jr. | 16/18 R |
| 3,537,125 | 11/1970 | Arenson | 16/31 R |
| 4,120,071 | 10/1978 | Crescenzi | 16/38 X |

FOREIGN PATENT DOCUMENTS

| | | | |
|---|---|---|---|
| WO80/01779 | 9/1980 | PCT Int'l Appl. | 16/47 |
| 434279 | 8/1935 | United Kingdom | 16/18 CG |
| 1150617 | 4/1969 | United Kingdom | 16/31 R |

*Primary Examiner*—Fred Silverberg
*Attorney, Agent, or Firm*—Edward D. O'Brian

[57] ABSTRACT

Desirable casters can be formed by using two separate, interfitting housing members to create the yoke of a caster. As these housing members are assembled they come together so as to hold the wheel of the caster generally between arms of the yoke (which are formed on the housing members) and so as to hold a shaft used in mouning the caster. Fasteners are provided so as to hold the housing members together in an operative configuration.

5 Claims, 4 Drawing Figures

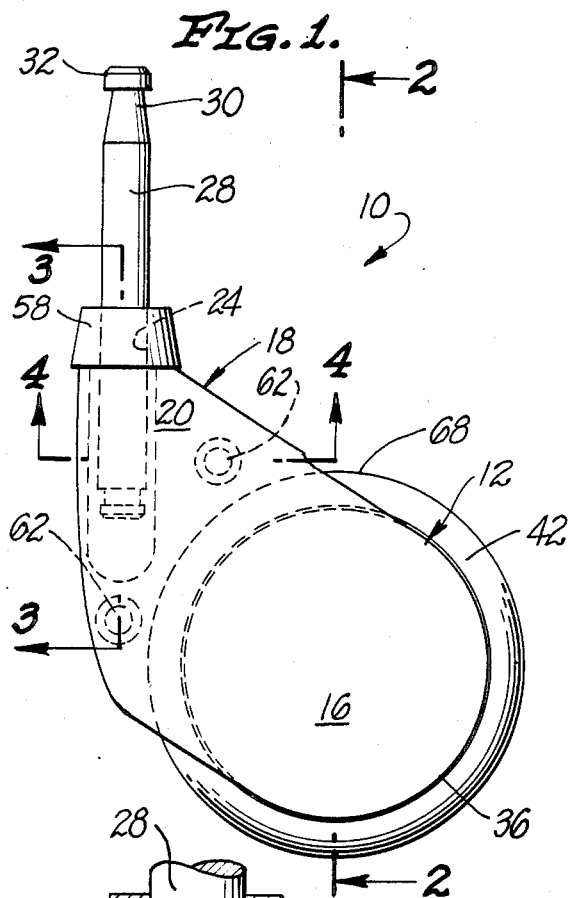
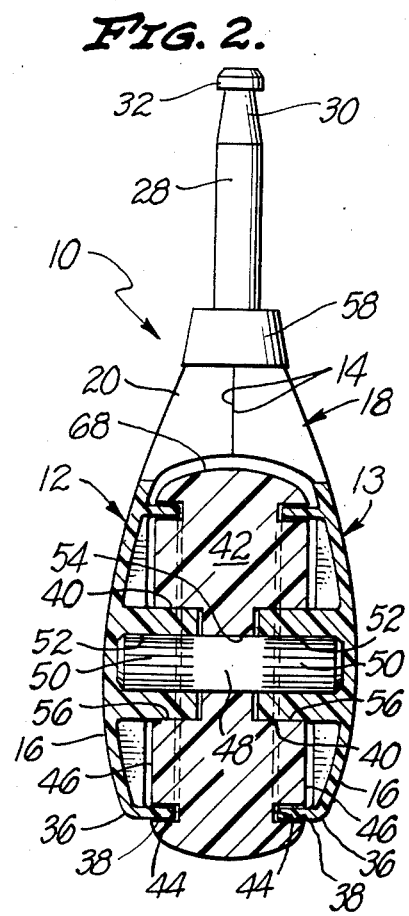
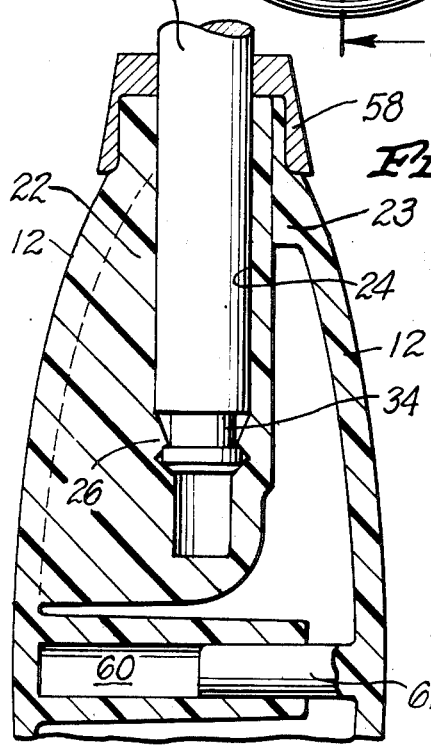
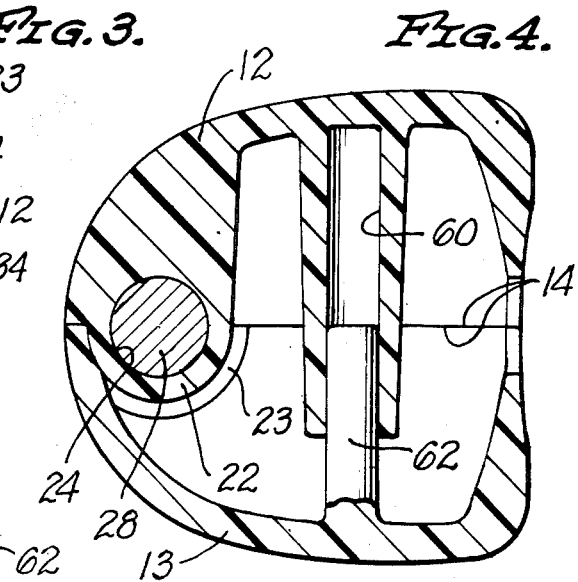

CASTER HAVING INTERFITTING HOUSING MEMBERS WITH INTEGRAL BEARINGS AND A SEPARATE AXLE

BACKGROUND OF THE INVENTION

The invention set forth in this specification pertains to new and improved casters. More specifically it pertains to casters which can be easily and conveniently manufactured at a comparatively nominal cost so as to have a desirable appearance.

The term "caster" as used in this specification is intended to designate a device of a type commonly used in supporting various different objects or structures such as various items of furniture, hand trucks, shopping carts and the like so that the objects or structures upon which the casters are used can be turned in various different directions as they are rolled from one location to another. These casters can be constructed in many different ways depending upon their intended use. Thus, for example, a caster may or not be constructed to have a decorative appearance depending upon whether or not it is to be used where its appearance is important for one reason or another.

It is believed that most casters are constructed so as to include a rigid yoke having a center portion or base and arms which extend generally parallel to one another from this central position, a wheel located so that the arms of the yoke extend along its sides, cooperating wheel support means for holding the wheel so that it can rotate about an axis extending between the arms and a caster support located on the central portion of the yoke for mounting the caster so that it can rotate about an axis which is offset relative to the axis of rotation of the wheel. Commonly the yoke in such a caster is a rigid metal structure in which the arms are used to hold a separate axle for the wheel so that the wheel can rotate about a horizontal axis while the caster support allows the caster to rotate about a vertical axis.

Structures as indicated in the preceding discussion are highly utilitarian and are quite desirable. However, in spite of this it is considered that there is a need for new and improved casters, especially for casters which can be easily and economically manufactured at a comparatively nominal cost so as to have a desired-normally an aesthetically pleasing appearance and which are capable of being used for prolonged periods with little or no maintenance. Further, it is considered that there is a need for casters which can be constructed so as to effectively use common polymer materials so as to obtain the economic and aesthetic advantages possible as a result of the use of such materials.

SUMMARY OF THE INVENTION

The invention is intended to fill the "needs" indicated in the preceding discussion. Thus, it is intended to provide casters which are desirable because they effectively use rigid polymers so as to obtain casters which have a desirable appearance and which can be used without the yokes of such casters having to be painted or otherwise treated so as to be protected against corrosion or so as have a desired appearance. The invention is also intended to provide casters which are relatively inexpensive to produce by virtue of the fact that the yokes in such casters can be inexpensively formed into a desired final configuration by known injection molding techniques and by virtue of the fact that they are constructed in such a way that they may be assembled with minimal difficulty.

Further, the invention is intended to provide casters which can be used for prolonged periods with little or no maintenance. It is believed that other, further advantages of the invention will be apparent to those who are concerned with the construction of casters from a consideration of the remainder of this specification.

These "objectives" of the invention are achieved by providing casters such as a caster constructed as indicated in the preceding discussion having a yoke used to support or hold a wheel and a caster suport so that the yoke is formed of two separate housing members shaped so as to have cooperating interfitting means on each for positioning these housing members together and fastener means securing these housing members against relative movement with respect to one another. Preferably—but not necessarily—the housing members are formed of a rigid polymer or "plastic" material or composition.

BRIEF DESCRIPTION OF THE DRAWING

It is considered that there are many other aspects of a desirable caster in accordance with this invention which will be apparent from a detailed consideration of the remainder of this specification in conjunction with the accompanying drawings in which:

FIG. 1 is a side elevational view of a presently preferred embodiment or form of a caster of the invention;

FIG. 2 is a cross-sectional view taken at line 2—2 of FIG. 1;

FIG. 3 is a partial cross-sectional view at an enlarged scale taken at line 3—3 of FIG. 1; and FIG. 4 is another partial cross-sectional view at an enlarged scale, this view being taken at line 4—4 of FIG. 1.

The particular caster illustrated and described in the remainder of this specification is constructed so as to utilize the concepts or principles of the invention set forth and defined in the appended claims forming a part of this specification. It is believed that it will be apparent to those who are normally concerned with the design and construction of casters that these concepts or principles can be used in differently constructed and/or appearing casters through the use of routine skill in the noted field.

DETAILED DESCRIPTION

The caster 10 shown in the drawing includes two housing members 12 and 13 which, when viewed from their exteriors appear nearly bilaterally symmetrical which are prepferably formed by conventional injection molding techniques out of a commonly available rigid polymer composition but which can also be formed of metal such as an iron alloy. These two members 12 and 13 are shaped so as to include edges 14 and arms 16. They are adapted to be located against one another so the edges 14 on the two members 12 and 13 are against one another as shown. When they are so positioned these members 12 and 13 create or define what may be considered as a yoke 18 having a central portion 20 which includes parts of these edges 14 and, of course, the arms 16.

The member 12 includes an extension 22 a hollow, vertically extending bore 24 including an internal horizontally extending flange 26. The extension 22 and the bore 24 in the housing member 12 can be regarded as a part of the central portion 20 of the yoke 18. A corresponding extension 23 on the housing member 13 fits closely against the extention 22 as shown. This bore 24 is intended to hold a vertically extending shaft 28 serving as a caster support means in mounting the caster 10 in a conventional manner in a known type of bearing member (not shown) so that the caster 10 is capable of being turned about a vertically extending axis which is the same as the axis of the shaft 28. A conventional tapered groove 30 and a top flange 32 are preferably used on the shaft 28 so as to aid in mounting it in such a bearing member. A groove 34 in the shaft 28 accomodates the flange 26 so as to retain the shaft 28 against removal from the caster 10.

The arms 16 are provided with semicircular ends 36 carrying circular internal flanges 38 located so as to face one another. These arms 16 also are provided with centrally located, aligned, cylindrical bosses 40 which also face one another. Both these flanges 38 and the bosses 40 are important in conjunction with a wheel 42 of the caster 10. These flanges 38 fit within circular grooves 44 located in the sides 46 of the wheel 42 so as to extend concentrically around an axle 48 used as a part of the caster 10. This axle 48 is provided with grooved ends 50 which can be press fitted within the interiors 52 of the bosses 40 so as to be secured against rotation.

The axle 48 extends through a centrally located axle opening or hole 54 within the wheel 42. Preferably this hole 54 is dimensioned so as to fit closely around the axle 48 and yet so that the wheel 42 can be turned easily upon this axle 48. The hole 54 extends between enlarged cylindrical bores 56 which fit closely around the bosses 40 in such a manner as to accommodate rotation. With this type of structure either the bores 56 or the hole 54 or both can be considered as a bearing serving to mount the wheel 42 so that is can be rotated relative to the arms 16 and the yoke 18.

The housing members 12 and 13 are secured to one another so that the shaft 28 and the wheel 42 are held in positions as described through the use of a ferrule 58 which fits around the shaft 28 and the extensions 22 and 23 so as to prevent these extensions 22 and 23 from spreading apart. The ferrule 58 is preferably dimensioned so that it can be forced into position and so that it is held in place by friction. If desired other known methods of holding this ferrule 58 in place can be used. Preferably the ferrule is not the only means used for securing these members 12 as described.

In the caster 10 these members 12 and 13 are also provided with internally located closely interfitting holes 60 and shaft-like projections 62 as best shown in figures 3 and 4 of the drawing. These holes 60 and the projections 62 serve as fasteners which prevent the members 12 and 13 from shifting relative to one another and may be easily assembled as shown by pushing them into place so as to create a press fit. If desired, a small quantity of an adhesive (not shown) may be used in the holes 60 so as to secure the projections 62 in place. Obviously other mechanically equivalent fasteners or fastening means can be used in place of the holes and projections 60 and 62, respectively. The periphery 68 of the wheel 42 is spaced from the central portion 20 of the yoke 18 so as to avoid any interference with the wheel 42 turning.

Normally the axle 48 will be formed of steel or a similar material which is significantly stronger than most common polymers or plastics as are available for use in the housing members at a nominal cost. Such materials may tend to "creep" if subjected to significant stress for a prolonged period. With the caster 10 the housing sections are designed so that such stresses in the housing members 12 and 13 will be distributed in such a manner that these housing members 12 and 13 can be formed of many common, relatively inexpensive polymers or plastics without there being any significant danger of these housing members becoming damaged or distorted either due to the stresses normally placed on a caster or due to such creep. Further, the disclosed structure the exteneion 22 is formed in such a way so as to accomodate the loads transmitted through the shaft 28.

Similarly, the ferrule 58 used with the caster 10 will normally be formed of steel or a similar material so as to minimize the chances of this ferrule 58 breaking or becoming damaged or distorted as the caster 10 is used. The design of the caster is thus characterized by the effective use of comparatively inexpensive polymer or plastic material for the largest parts used so as to achieve the economic advantages of such material as well as the ability to use such material without having to paint or otherwise finish it. This is considered significant. Although it is preferable to use a plastic or polymer material for the housing members 12 the latter can, of course, be manufactured from a solid metal composition such as steel.

It is noted that the flanges 38 fit within the grooves 44 in such a manner as to make it difficult for thread or the like to get generally between the wheel 42 and the yoke 18 and to accumulate in such location to an extent that such accumulations interfere with the rotation of the caster 10 by accumulations between the wheel 42 and the yoke 18, the disclosed construction makes it difficult for this to occur.

I claim:

1. In a caster constructed so as to include a rigid yoke having a center portion and arms which extend generally parallel to one another from the center portion, a wheel located so that the arms of the yoke extend along its sides, cooperating wheel support means on the wheel and on the yoke for holding the wheel so that it can rotate about an axis extending between the arms and a caster support located on the center portion of the yoke for mounting the caster so that it can rotate about an axis which is offset relative to the axis of rotation of the wheel the improvement which comprises:

said yoke being formed of two separate housing members, each of said arms being integral with one of said members, cooperating interfitting means on both of said members for positioning said housing members so that they cannot slide relative to one another, and fastener means for securing said housing members against relative movement with respect to each other, said fastener means extending between and engaging both of said housing members, said arms include aligned cylindrical bosses on the adjacent surfaces of said arms, and said wheel is shaped so as to receive said bosses so that said bosses serve as an axle for said wheel, said bosses are hollow bosses having aligned openings formed therein and including a separate axle located within both of said bosses so as to extend between said arms.

2. A caster as claimed in claim 1 wherein:

said sides of said wheel include circular grooves extending around said axis, and said arms include internal flanges which fit within said grooves so as to permit rotation of said wheels.

3. A caster as claimed in claim 2 wherein: said internal flanges are circular flanges.

4. A caster as claimed in claim 1 wherein:
said housing sections also include extensions which are located adjacent to one another, and
said fastener means includes ferrule means extending around and engaging both of said extensions,
one of said extensions is shaped so as to define a vertically extending bore located therein, said bore including an internal horizontally extending flange located therein,
said caster support means includes a vertically extending shaft located within said bore, said shaft including a peripheral groove, said flange within said bore fitting within said groove.

5. A caster as claimed in claim 4 wherein: said housing members are solid polymer compostion members.

* * * * *